United States Patent [19]

Volk et al.

[11] Patent Number: 5,306,876
[45] Date of Patent: Apr. 26, 1994

[54] BATCH WEIGHING APPARATUS WITH BULK BAG TYPE BINS

[75] Inventors: Benjamin L. Volk, St. Louis; Joseph A. Volk, Jr., Creve Coeur, both of Mo.

[73] Assignee: Beta Raven, Inc., Earth City, Mo.

[21] Appl. No.: 699,988

[22] Filed: May 10, 1991

Related U.S. Application Data

[63] Continuation-in-part of Ser. No. 629,157, Dec. 19, 1990, Pat. No. 5,141,135.

[51] Int. Cl.⁵ .......................................... G01G 19/22
[52] U.S. Cl. ........................... 177/70; 222/203; 222/105
[58] Field of Search ............... 222/77, 105, 199, 202, 222/203, 412, 413; 177/59, 70; 141/21, 22, 24, 68, 75, 77

[56] References Cited

U.S. PATENT DOCUMENTS

| | | | |
|---|---|---|---|
| 3,363,806 | 1/1968 | Blakeslee et al. | 222/202 |
| 3,372,725 | 3/1968 | Voorhees | 222/105 |
| 4,000,833 | 1/1977 | Marks | 222/105 |
| 4,036,411 | 7/1977 | Westhoff | 222/413 |
| 4,332,334 | 6/1982 | Mian | 222/105 |
| 4,527,716 | 7/1985 | Haas et al. | 222/105 |
| 4,538,693 | 9/1985 | Klopfenstein et al. | 177/59 X |
| 4,669,950 | 6/1987 | St. Lawrence | 222/105 |
| 4,863,065 | 9/1989 | Decrane | 222/105 |
| 4,913,321 | 4/1990 | Abboud | 222/105 |
| 4,946,071 | 8/1990 | Poulton | 222/105 |
| 4,966,311 | 10/1990 | Taylor | 222/105 |
| 5,033,706 | 7/1991 | Poulton | 222/105 |
| 5,148,943 | 9/1992 | Moller | 222/1 |
| 5,154,326 | 10/1992 | Chang et al. | 222/196 |
| 5,160,016 | 11/1992 | Moksnes | 198/533 |

Primary Examiner—Benjamin R. Fuller
Assistant Examiner—Randy W. Gibson
Attorney, Agent, or Firm—Rogers, Howell & Haferkamp

[57] ABSTRACT

A batch weighing apparatus includes a plurality of soft sided bulk bags containing a quantity of bulk dry material which are rack mounted thereon and which have generally U-shaped bracket assemblies mounted thereunder for agitating the material in the bulk bag for free flow therethrough. The plurality of bulk bags are used in place of the rack mounted bins in prior art devices and permit shipment, storage, and dispensing of bulk dry material from the same soft sided bag.

11 Claims, 2 Drawing Sheets

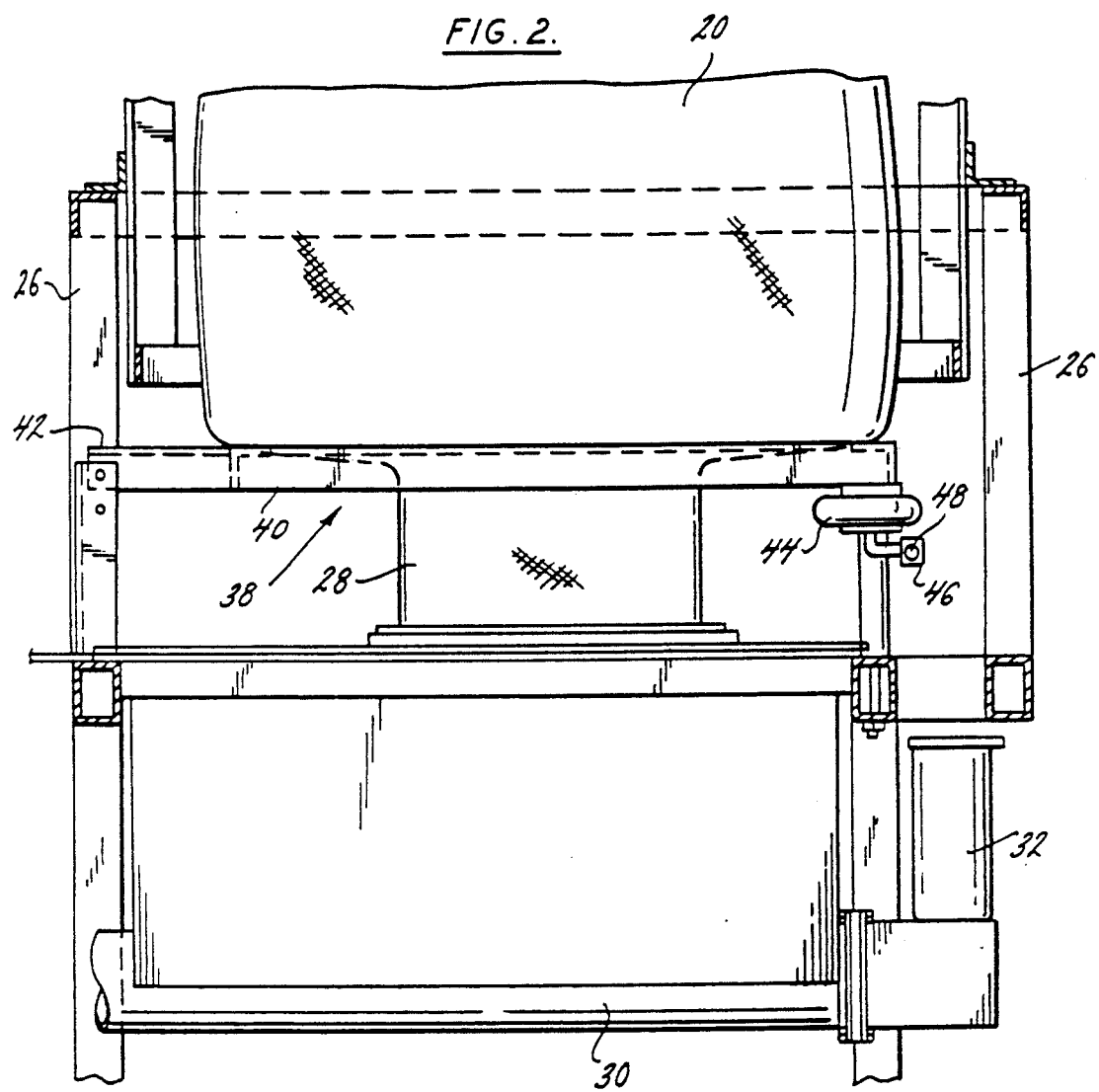
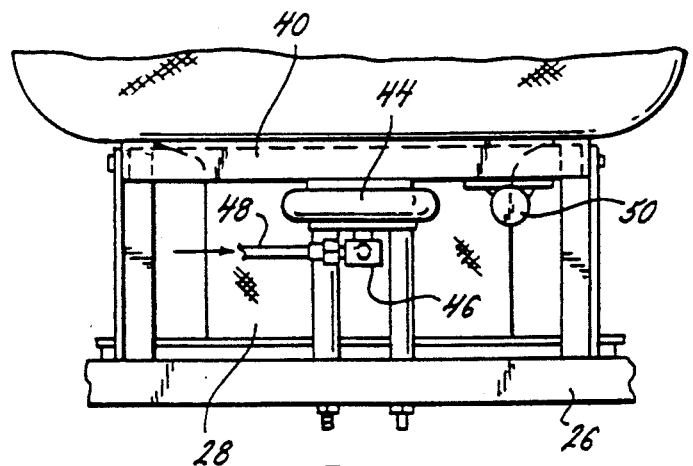

BATCH WEIGHING APPARATUS WITH BULK BAG TYPE BINS

CROSS REFERENCE TO RELATED APPLICATION

This application is a continuation-in-part of Ser. No. 07/629,157 filed Dec. 18, 1990, U.S. Pat. No. 5,141,135.

BACKGROUND AND SUMMARY OF THE INVENTION

There are many processes which utilize dry material which is stored in bulk and fed from a bulk container by a screw conveyor, auger, or the like, for batch processing, for example. Although these dry materials have been shipped and stored in rigid containers, recently large bags have been developed for this purpose. Generally, in the prior art, this dry material is emptied from the bulk bags into rigid walled storage bins or feeder bins, and the material is then augered from these feed bins into the process, as desired. Although these bulk bags would otherwise be suitable for rack mounting and direct feeding therefrom, there is an inherent problem with many dry materials that inhibits a bulk bag's use in that manner. Some of these problems include the tendency for the dry material to absorb moisture from the humidity in the air and partially solidify within the bag to thereby impede the free flow of dry material from a pourspout or the like which is often conveniently built into the bottom of bulk bags. This is sometimes referred to as bridging or rat holing. This partial solidification may also be caused merely by the passage of time as the bags are transported or sit awaiting use. Furthermore, a bag may be mounted in a rack and the material adequately loosened to flow freely initially, but the material may then agglomerate or otherwise compact or obstruct the pourspout such that an even, reliable flow of material from the bag until empty is difficult to achieve.

The inventor herein is aware of attempts in the prior art to solve this problem. As best understood, one such prior art attempt consists of a generally rectangular bracket member which is pivotally mounted, much as a child's teeter-totter, and formed in a cradle-like shape. A motor with an eccentric or the like is coupled to an outboard end of the rectangular bracket and used to oscillate the bracket against the bottom of the bag. Because the bag's pourspout has to be loosened and fitted into a surge hopper, the bracket member is initially retracted below the surge hopper and then cranked upwardly into position after the bag is lifted into position above the surge hopper and its pourspout fitted in place. This procedure is necessary to allow unrestricted access to the pourspout for initially loosening it and aligning it with the surge hopper.

While this may improve the flow of material from within the bag, it is not viewed as a complete solution in that the force exerted against the bag is limited to an oscillating teeter-totter motion with a restricted range of movement "into" the bag bottom. Thus, the forced movement of the material in the bag which would have a tendency to break up these agglomerations or partial solidifications is necessarily restricted. Perhaps because of this restricted movement, the prior art teaches the use of a second stage of agitation in the surge hopper, which receives the dry material after it has left the bag, to ensure a smooth flow of dry material. In other words, the prior art uses not only the oscillating bracket to agitate the material in the bag, but also a surge hopper with its own agitation mechanism to ensure a reliably loose material suitable for smooth flow such as by augering or the like. Furthermore, the inventor herein in is unaware of any attempt to use a bulk bag as a substitute for a rigid walled bin by racking a plurality of these bulk bags above a weigh hopper, or the like, and augering a measured quantity of material directly from the bulk bags themselves.

In order to solve these and other problems in the prior art, the inventor herein has succeeded in designing and developing a bracket arrangement as the single agitation mechanism for feeding dry material directly from these bulk bags. The bracket is selectively activated whenever flow is called for to physically knead the lower portion of the bag and the dry material adjacent the pourspout which provides a significant improvement in loosening the dry material just before it exits the bag. Additionally, a vibrator may be mounted on the bracket in order to not only deflect the bag bottom but also vibrate it. The inventor's bracket does not just oscillate in a limited range of motion, but it pushes radically upward into the bag as it is pivoted at one end thereof and not in its middle as in the prior art. Also, the control for the bracket assembly can be used to push against the lower portion of the bag once, twice, or repeatedly during the course of material discharge. With different kinds of dry materials, one or more of these different operating routines may be used to best effect.

By utilizing brackets as the agitation mechanism, bulk bags which hold hygroscopic materials, such as food ingredients, may readily be used for direct dispensing in addition to the shipment and storage of the materials. This is especially important and provides a major advantage over the prior art in that these food materials need not be emptied from their bulk bags and loaded into individual bins which are typically rack mounted in prior art batch weighing devices. Thus, the additional steps required to handle these rather bulky bags as necessary to dump their contents into bins are eliminated. Furthermore, even after the material is dumped into the bins of the prior art batch weighing devices, additional measures are required to maintain the material in a free flowing state. These various mechanisms as known in the prior art are similarly replaced by the bracket arrangement as disclosed herein. As can be appreciated, a substantial savings in cost can also be realized in that the rack mounted bins included in prior art batch weighing devices are eliminated. For food applications, these bins were typically stainless steel and required to meet FDA standards of cleanability and the like. These highly labor intensive maintenance operations in order to maintain FDA standards are also eliminated and represents a further savings.

The bracket assembly essentially consists of a U-shaped bracket which is pivotally mounted beneath the bag at the ends of the legs of the U, and an air cylinder which supports the closed end of the U from the surrounding framework. This U-shaped design and its mounting allow free access to the bag bottom and its pourspout after it has been mounted onto the framework and does not require the crank mechanism for raising the bracket from a lowered position as suggested by the prior art. As the bulk bags in the inventor's system may be typically arranged in two banks, or rack mounted, a walkway through the middle of these two banks or racks is adjacent one side of every bag and the open end of the U-shaped bracket permits an operator to have free and ready access to the bag bottoms for purposes of unfolding the pourspout where it is secured for storage and shipping purposes, and inserting the pourspout into a downspout or other feed arrangement as is known in the art to provide a ready path for dry material as it exits the bag.

The U-shaped bracket substantially surrounds the pourspout and engages the bottom of the bag which is the portion of the bag closest to the material which immediately exits therefrom and therefore is positioned for maximum effect. The vibrator is positioned on the portion of the U-bracket which engages the bag bottom and is vertically oriented to thereby be maximally coupled to the dry material. The air cylinder is of the rubber bladder inflation type thus permitting the vibrator to be effective by inducing vibrations into the bag through the soft coupling between the U-shaped bracket and the frame. The travel of the U-shaped bracket may be adjusted by physically changing the mounting location of the bracket, and by choosing an air cylinder having a different inflation extension. The U-shape design and movement of the bracket from these positions allow for maximum effectiveness in agitating the dry material while eliminating obstruction of the pourspout.

While the principal advantages and features of the present invention have been briefly described above, a greater understanding of the invention may be attained by referring to the drawings and description of the preferred embodiment which follow.

BRIEF DESCRIPTION OF THE DRAWINGS

FIG. 2 is a partial cross-sectional view taken along the plane of line 2—2 in FIG. 1 and showing a side view of the bracket assembly and air cylinder;

FIG. 3 is an enlarged view of the air cylinder with a dump valve for rapid deflation thereof; and FIG. 4 is a flow chart for the typical software program for use with bracket assembly 38.

DETAILED DESCRIPTION OF THE PREFERRED EMBODIMENT

Figure 1:
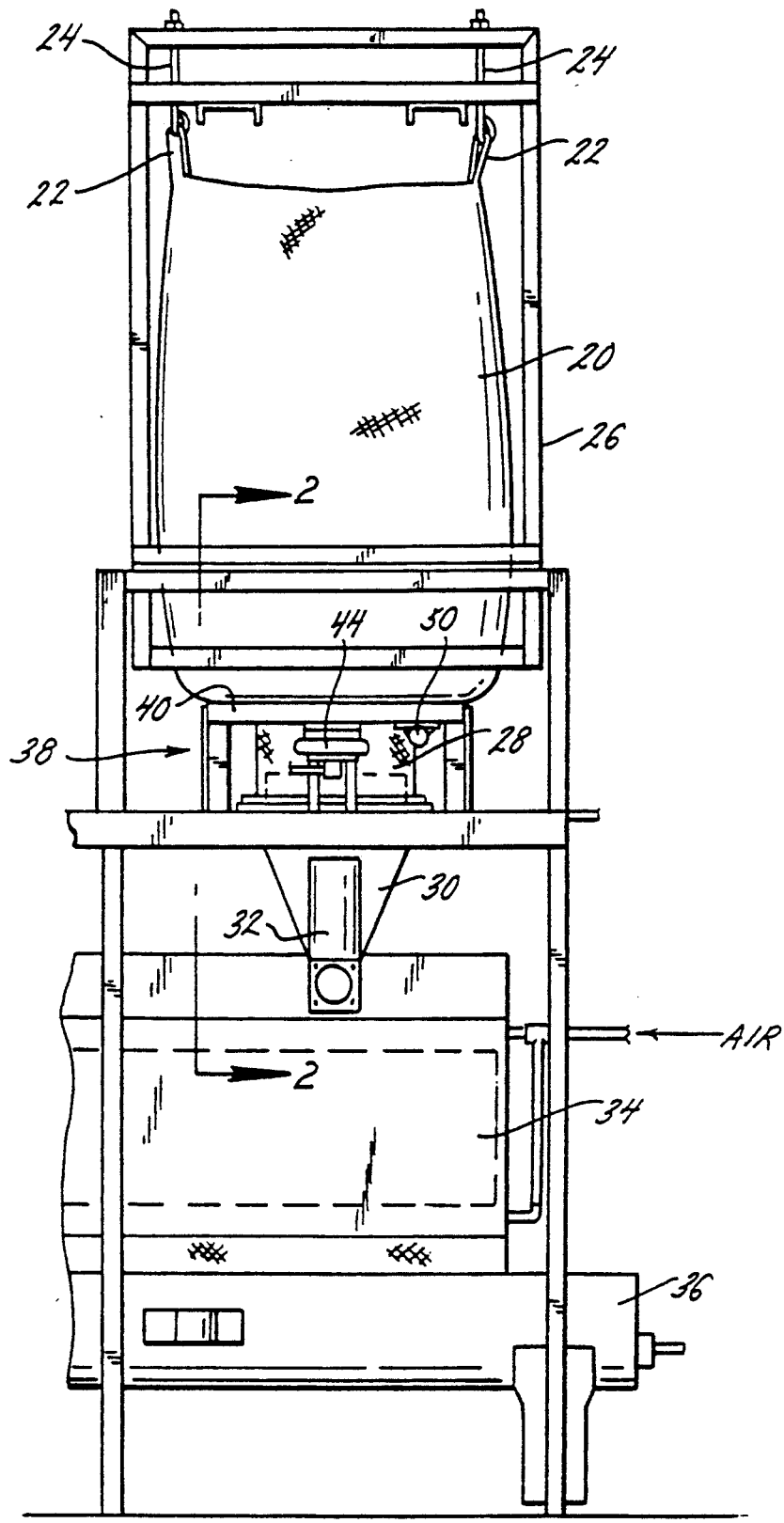
FIG. 1 is a partial side elevational view of a typical dry material feeder except with a bulk bag secured to a framework and supported above an auger and weigh hopper.

For purposes of clarity, FIG. 1 depicts just one bulk bag supported on a framework of a batch weighing apparatus. However, it will be well understood by one of ordinary skill in the art that additional bulk bags may be similarly supported and mounted closely adjacent one another, much as the bins which are used in the prior art.

Referring now to FIG. 1, a bag 20 containing dry material in bulk form may be suspended near its top by a plurality of loops 22 which support the bag 20 from eyelet members 24 located near the four corners of the top of the bag 20. The eyelets 24 are themselves supported from a framework 26 such that the bag 20 and its dry material are supported above a discharge chute 28 through which dry material is fed into an auger 30 driven by a gear motor 32. Dry material exits the auger 30 into a weigh hopper 34 and is weighed in a batch before dumping into an air transfer conveyor 36. In accordance with the present invention, a plurality of bags 20 are supported from the same framework 26 along a series of rows, each bag 20 having its own discharge chute 28 and auger 30 such that a plurality of materials may be dumped into the same weigh hopper 34 and batch weighed before being transferred by conveyor 36 where the batch is used in a food or chemical process.

Mounted beneath the bottom of bag 20 is the bracket assembly 38. The bracket assembly 38 includes a generally U-shaped bracket member 40 pivotally supported at its ends 42 from framework 26. Additional pivot holes 43 are provided to accommodate bags filled with material having differing densities. For those bags filled with wheat gluten, for example, the bag might weigh as much as 2300 lb. and sag over the lip of discharge chute 28 much more than a bag filled with wheat bran which might weigh as little as 1000 lb. Thus, a 2"–3" difference in bag sag may be experienced which pivot holes 43 may thus adjust for to position the bracket member 40 immediately adjacent the bottom of bag 20. As best seen in FIGS. 2 and 3, the U-shaped bracket 40 substantially surrounds the pourspout (not shown) which extends from the center of the bottom of bag 20 into discharge chute 28. Furthermore, the U-shaped bracket 40 is arranged to contact the lower portion or bottom surface of bag 20. At the outboard end of bracket 40, or the end opposite the pivotal connections at the open ends 42, an air cylinder 44 is mounted thereto and extends between the bracket 40 and the frame assembly 26. Air cylinder 44 is preferably a rubber bladder inflatable type such as a Firestone air mount to provide a soft coupling between the bracket member 40 and framework 26. Other types of inflatable deflecting devices could be used, and perhaps even rigid deflecting devices although it is believed that the vibratory forces have a greater effect with a soft coupling between the bag 20 and bracket member 40. As best shown in FIG. 3, an air valve 46 is mounted in the air line 48 used to provide compressed air for filling the air cylinder 44. A vibrator 50 is mounted on the bracket portion adjacent air cylinder 44 and is vertically oriented to thereby introduce vibratory forces into the dry material as the bracket 40 is pushed upwardly into the bag 20.

One example of a software program which can be used for a microprocessor (not shown) to control the inflation and deflation of the air cylinder 44 which pushes bracket 40 upwardly into the bottom surface of bag 20 is shown in Attachment A. Up to ten bins may be racked on the same framework, with each bin having its own bag and associated bracket assembly Upon selection of a particular bin for augering out dry material from its associated bag, the software program has a series of time delays to permit the feeder or auger to be turned on and come up to speed before the bracket assembly is actuated and its vibrator turned on to knead and vibrate the bottom of the bag. Two parallel loops are used with timers to control the on and off cycling of the air cylinder so that the bracket assembly may be operated in different modes corresponding to the particular material contained within the bag. For example, the bracket assembly may be just driven upwardly once and then returned to its original position. Still another example would be for the air cylinder to drive the bracket up and down repeatedly for longer draws of material from a bag. As would be apparent to those of ordinary skill in the art, the program shown on Attachment A is merely an example of several modes of operation which may be achieved. Other modes could be adopted in order to suit the material contained within the bag, feed rate, and other physical parameters. A test mode may also be provided to permit selective energization of each bracket in order to observe its operation for adjustment, etc.

As noted above, the bracket is pivotally attached at one side and supported by an air cylinder at the other. Therefore, when the air cylinder is activated, the bracket is pushed upwardly into the bag bottom to substantially deflect it in a kneading action, and introduce vibration, which directly breaks apart any agglomeration. This increased travel and direct physical contact over virtually the entirety of the bag bottom yields reliable flow for the entire contents of the bag.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A bulk storage, batching and dispensing apparatus, said apparatus comprising means for supporting a plurality of bags, each of said bags containing a quantity of dry material in bulk form, means associated with each bag for agitating the bulk dry material contained therein, means for feeding a measured amount of the dry material from each selected one of said bags into a collecting means to thereby create a batch comprised of said a plurality of dry material, and means for conveying said batch of dry material contained within said collecting means to a receiver.

2. The apparatus of claim 1 wherein said feeding means includes a trough associated with each bag for receiving said dry material as said dry material exits from said dry material's associated bag, and means associated with each trough for moving said dry material from within said trough to said collecting means.

3. The apparatus of claim 2 wherein said bag supporting means includes means for supporting said bags from their tops, said bags having bottom pourspouts, and wherein said bags are rack mounted in close proximity to thereby simulate the close spacing of bins.

4. The apparatus of claim 3 wherein each of said troughs is positioned beneath said trough's associated bag, and wherein said bag agitating means comprises the sole means for maintaining a continuous flow of dry material from within each of said bags and into and through their associated troughs.

5. The apparatus of claim 4 wherein each of said moving means comprises an auger.

6. The apparatus of claim 5 wherein said bag agitating means comprises a pivotally mounted bracket and means for pushing said bracket into said bag to thereby agitate the dry material contained therein.

7. A batch weighting apparatus comprising means for supporting a plurality of bags in a rack mounted manner, with each of said bags containing a quantity of dry material in bulk form, said batch weighting apparatus having means associated with each of said bags for agitating the dry material contained therein to thereby ensure a reliable, even flow thereof out of said bags, a feeding means associated with each bag, and a weigh hopper, said feeding means having means for feeding a desired quantity of said material from the bags into said weigh hopper to thereby create a batch of dry material.

8. The apparatus of claim 7 wherein each of said agitating means comprises the sole means for mixing said dry material as said dry material gravity feeds from said bags into said feeding means and is fed into said weigh hopper.

9. The apparatus of claim 8 wherein each of said agitating means comprises a bracket positioned beneath the bottom of said agitating mean's associated bag and means for urging said bracket member up into said bag.

10. The apparatus of claim 9 wherein each of said bags is supported above each of said bag's associated feeding means.

11. The apparatus of claim 10 wherein each of said feeding means comprises a generally V-shaped trough under said bag, and an auger positioned in said trough to convey said dry material out of said trough and into said weigh hopper.

* * * * *